March 28, 1944.　　W. A. WINTER ET AL　　2,345,442
LOCKING CASTER
Filed March 17, 1942　　4 Sheets-Sheet 2
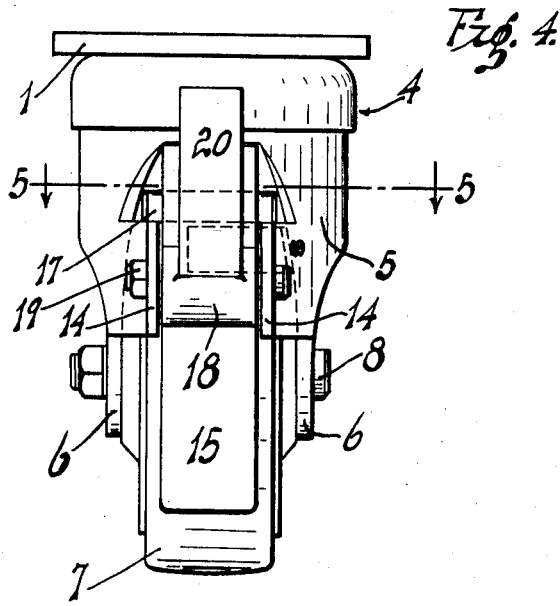
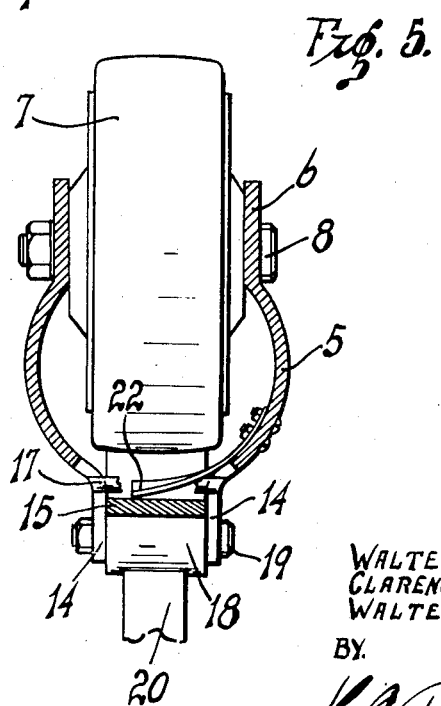
INVENTORS.
WALTER A. WINTER.
CLARENCE G. RUSH.
WALTER H. THIESSEN.
BY
　　　　　ATTORNEY.

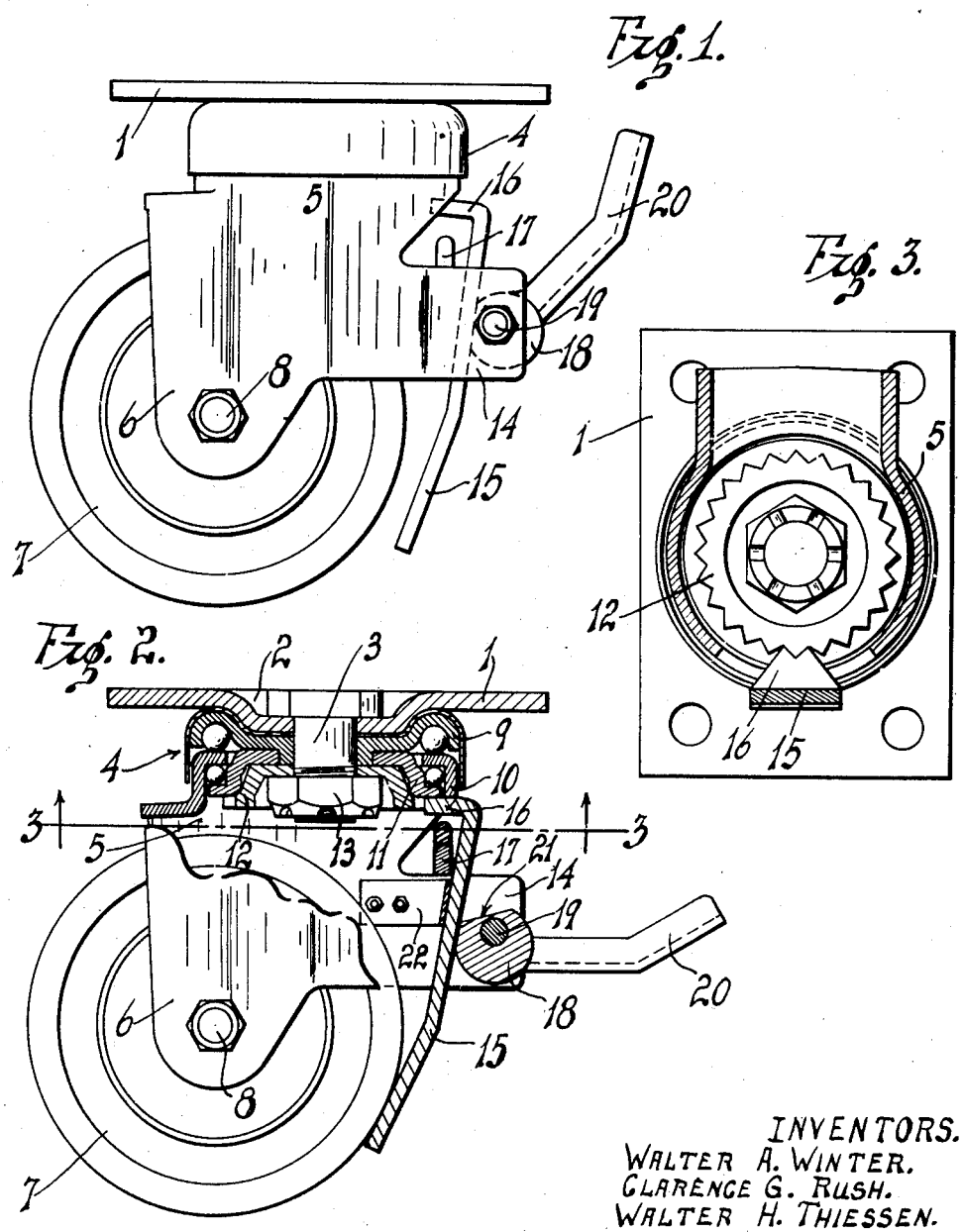

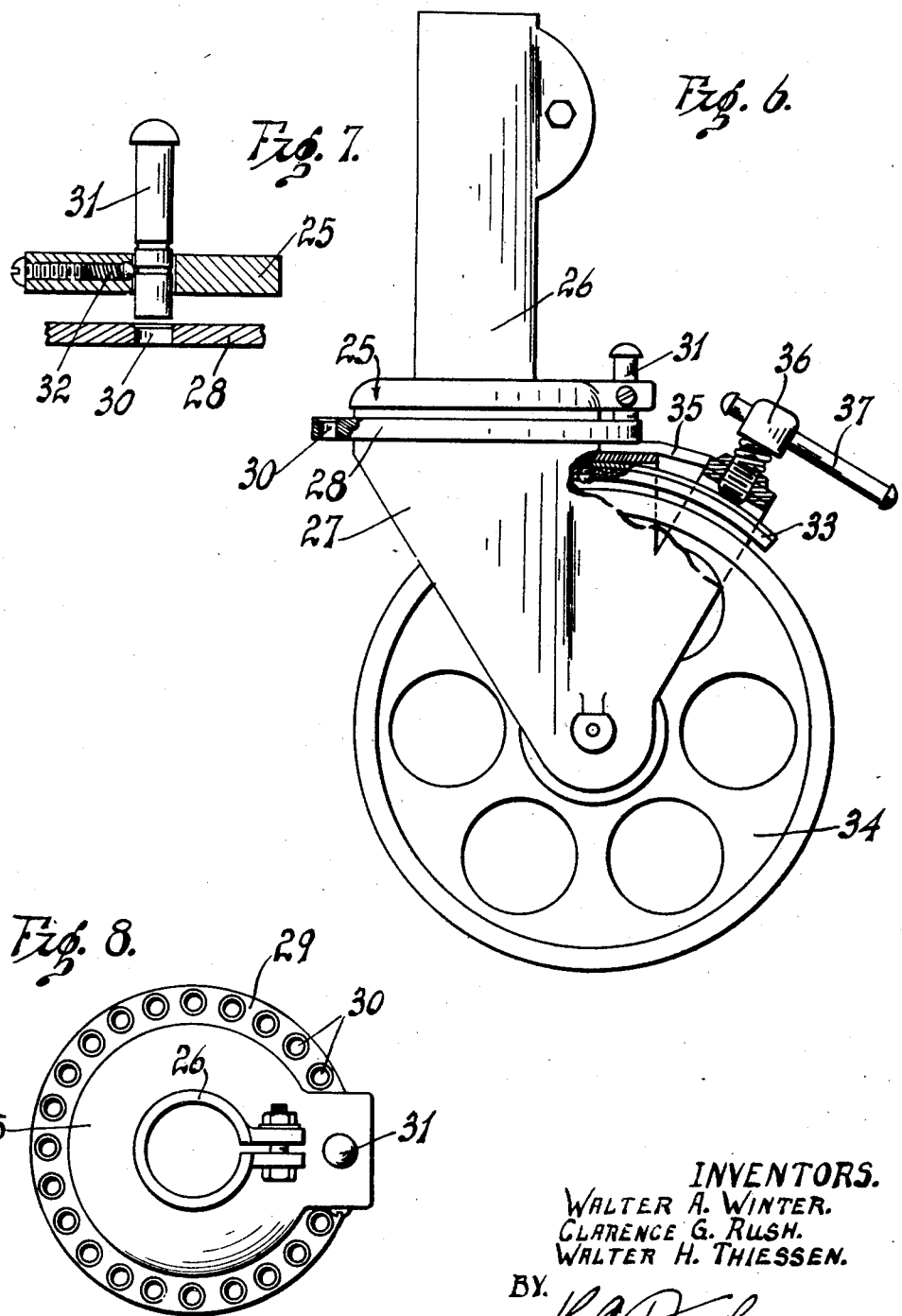

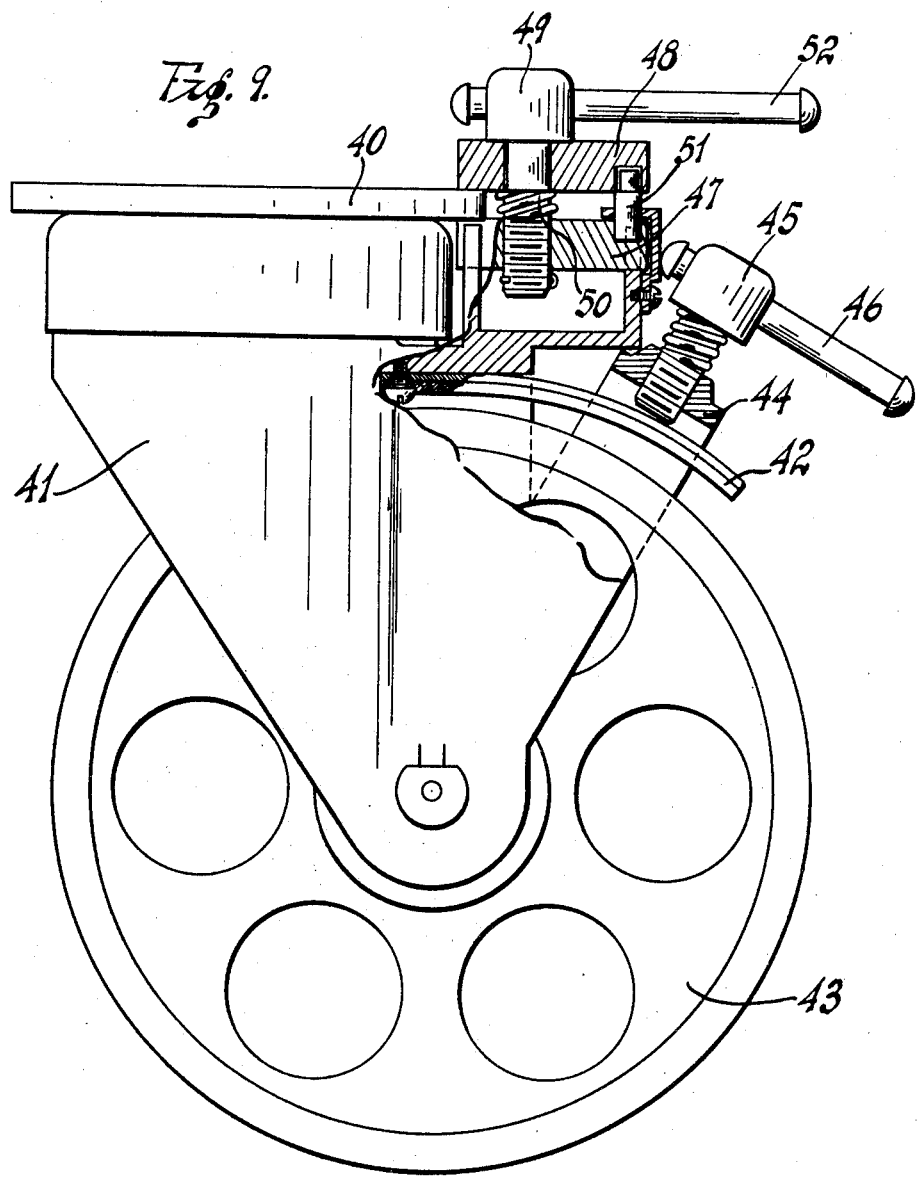

Patented Mar. 28, 1944

2,345,442

UNITED STATES PATENT OFFICE 2,345,442

LOCKING CASTER

Walter A. Winter, San Pedro, and Clarence G. Rush and Walter H. Thiessen, Long Beach, Calif.

Application March 17, 1942, Serial No. 434,988

3 Claims. (Cl. 16—35)

This invention relates to a locking caster of the type which is provided with a manual lock, or latch, and further, of the type which may be mounted on portable scaffolding, engine mounts, and the like, such as are used in the aircraft industry and other similar places. In moveable supporting structures such as scaffolds, engine mounts, and the like, and upon which casters are mounted, it is necessary to provide a secure foundation which will not accidentally move while men are at work on the structure.

An object of our invention is to provide a novel locking caster which may be set to prevent the wheel of the caster from rolling and from swivelling.

Another object is to provide a novel locking caster which is provided with an improved and novel braking and/or locking means.

A feature of our invention is to provide a novel locking caster which, when locked, cannot swivel or roll even though considerable force may be applied to the structure upon which the caster is mounted.

Other objects, advantages and features of invention may appear from the accompanying drawings, the subjoined detailed description and the appended claims.

In the drawings

Figure 1 is a side elevation of our caster with the brake and latch means in off position.

Figure 2 is a side elevation of our caster with the brake and latch means in set position and with parts broken away to show interior construction.

Figure 3 is a sectional view taken on line 3—3 of Figure 2.

Figure 4 is an end view of our caster.

Figure 5 is a sectional view taken on line 5—5 of Figure 4.

Figure 6 is a side elevation of a modified form of our caster with parts broken away to show interior construction.

Figure 7 is a fragmentary transverse sectional view of the yoke and locking pin, whereby the yoke may be locked.

Figure 8 is a top plan view of this modified form of caster.

Figure 9 is a side elevation of another modified form of our caster with parts broken away to show interior construction.

Referring more particularly to the drawings, our caster is mounted on a suitable structure by means of a base plate 1. The base plate is provided with a central depression 2 which receives the head of an assembling bolt 3. The assembling bolt 3 holds the various parts of a ball bearing 4 in position, and the details of this bearing will be subsequently described. A yoke 5 is formed with a pair of spaced legs 6, 6, which are preferably integrally formed with the yoke. A caster wheel 7 is mounted on an axle 8, said axle extending through, and is mounted in, the leg 6, 6. The ball bearing 4 consisting of an upper race 9, a lower race 10 is fixedly mounted on, or is a part of, the yoke 5. A notched, toothed, or serrated ring 12 fits against the inner race 11, and the nut 13 which screws on to the bolt 3 bears against this ring, thus holding the various parts of the ball bearing in assembled position. As shown, the usual ball bearings are provided between the races 9, 10 and 10, 11, thus providing a double ball bearing. A pair of spaced arms 14, 14 project outwardly from the yoke 5, and are substantially horizontal. These arms are either fixedly mounted on the yoke, or may be an integral part thereof. A brake shoe 15 is positioned between the arms 14, 14 and these arms further hold the brake shoe against lateral movement, that is, the arms act as guides. The upper end of the brake shoe 15 is bent inwardly, as shown at 16, and this bent position of the brake shoe is notched, or pointed, so as to fit into the notches, or teeth, of the ring 12 when the brake is set. In released position, the portion 16 is moved away from the ring 12, thus permitting the caster to swivel freely. A stop bar 17 extends between the arms 14, 14 and under the bent portion 16 of the brake shoe, the purpose of this stop bar being to prevent the brake shoe from dropping downwardly during the normal operation of the caster. The bent portion 16 will engage the stop 17, thus preventing the brake shoe from moving downwardly to the extent that the bent portion 16 thereof might not engage the ring 12. The stop bar 17 is spaced inwardly a sufficient amount to permit a translatory movement of the brake shoe. This translatory movement of the brake shoe is accomplished in the following manner:

A cam, or eccentric 18, is mounted between the arms 14, 14 on a pin 19 which extends through these arms. The cam is operated through the medium of a lever 20 which is fixedly attached thereto, and is manually actuated. When the lever 20 is pushed downwardly, the cam 18 will rotate, moving the brake shoe 15 inwardly in an amount sufficient to engage the wheel 7, and simultaneously to engage the toothed ring 12. Thus, on translatory movement of the brake shoe, the caster wheel will be held against rotation, and the yoke will be held against swivelling movement due to the engagement of the brake shoe with the stationary toothed ring 12. The cam 18 is provided with a flat face 21 which bears against the brake shoe 15 when the cam is in released position. This provides a flat surface against which the brake shoe rests when it is released, and thus provides a seat for the brake shoe, preventing accidental displacement of the shoe. A spring 22 is mounted on the yoke 5 and bears against the inside of the brake shoe 15, urging the brake shoe outwardly into off position, and also urging the brake shoe against the eccentric, or cam 18. The spring 22 is preferably of the flat type, which exerts a considerable force against the brake shoe, thus effectively holding the brake shoe in released or off position, and also tending to hold the brake shoe against vertical displacement.

It will be readily apparent that the brake shoe is held in floating condition between the cam and spring requiring no fixed support of the brake shoe in the yoke.

From the foregoing description, it will be evident that we have provided a caster, including a brake, which will effectively grip the caster wheel, holding the wheel against rotation and simultaneously engaging a stationary toothed, or notched, ring preventing swivelling of the caster. Further, the type of ball bearing and the mounting thereof enables a flat base plate to be used, thus eliminating a central shank and providing a better and more secure mounting for the caster. If a central shank is desirable, the bolt 3 could be extended to provide this shank.

In the modified form of locking caster, shown in Figures 6 to 8, inclusive, a base plate 25 is provided, the base plate being suitably attached to a structure, the attaching means being a sleeve 26, or an analogous structure. A yoke 27 is suspended from the base plate 25 and may include a suitable ball bearing between yoke and the base plate, similar to the ball bearing construction previously described. The yoke 27 includes a flange 28 at the upper end thereof, this flange being positioned immediately under the base plate 25. A plurality of circumferentially spaced holes 30 are provided in the flange. A locking pin 31 is mounted in the base plate and extends through this base plate and when the locking pin is pressed downwardly, it will enter one of the holes 30, thus holding the yoke against rotation, or in other words, locking the yoke. A spring pressed detent 32 engages the pin 31 for the purpose of holding this pin in either raised or lowered position. A brake shoe 33 is attached at one end to the yoke 27 and extends over and conforms to the curvature of the caster wheel 34, which is mounted in the yoke 27. An arm 35 extends from the yoke 27 and is spaced above the brake shoe 33. A threaded stud 36 is threaded through the arm 35 and bears against the brake shoe 33. When the stud 36 is screwed downwardly the brake shoe 33 will be forced against the periphery of the wheel 34, thus braking the wheel and holding said wheel against rotation. The pin 37 may be mounted in the stud 36 so that this stud can be more easily rotated for the purpose of setting the brake shoe against the wheel. The brake shoe 33 may be lined with suitable brake material if it is further desirable or advantageous.

In the modified form of our caster shown in Figure 9, a base plate 40 is provided of a suitable type so that the caster may be mounted on a suitable structure. The yoke 41 is suspended from the base plate 40 by some suitable means, such as the ball bearing construction and its assembly described in Figures 1 to 5, inclusive. A brake shoe 42 is secured at one end to the yoke 41 and extends over the periphery of the caster wheel 43 and conforms generally to the periphery of the caster wheel as described in Figures 6 to 8, inclusive. An arm 44 extends from the yoke 41 and is spaced above the shoe 42. A threaded stud 45 is threaded through the arm 44 and bears against the brake shoe 42 for the purpose of pressing the brake shoe against the periphery of the wheel 43 and thus braking the wheel. A pin 46 on the stud 45 may be provided so that the stud may be more easily rotated when the brake shoe is set against the wheel. A plate 47 fixedly attached to, or may be an integral part of the yoke 41. This plate extends under the base plate 40 for the purpose of gripping the base plate as will be further described. A block 48 is mounted above the plate 47 and engages the upper surface of the base plate 40. A stud 49 extends through the block 48 and is threaded into, or through the plate 47. The head of the stud bears against the top of the block 48 for the purpose of forcing the block downwardly against the base plate 40, when the stud 49 is rotated. A coil spring 50 is arranged between the block 48 and the plate 47 for the purpose of holding the block and the plate apart, when it is not desired to lock the yoke 41. A pin 51 rises from the plate 47 and extends into the block 48, thus preventing the block from rotating about the stud 49, when it is desired to lock the yoke 41. The stud 49 is screwed downwardly into the plate, thus clamping the plate and the block 48 against the bottom and top, respectively, of the base plate 40, thereby holding the yoke 41 against rotation. A handle 52 may be provided on the stud 49 so that this stud may be more easily rotated when it is necessary to lock the yoke 41.

Having described our invention, we claim:

1. A caster comprising a base plate, a yoke swivelly mounted from said base plate, a caster wheel rotatably mounted in said yoke, a stationary toothed ring mounted within the yoke and above the caster wheel, a pair of spaced arms projecting from the yoke, a brake shoe mounted between the arms for translatory movement, the lower end of said brake shoe frictionally engaging the caster wheel, the upper end of said brake shoe being bent inwardly for engagement with the toothed ring on translatory movement of the brake shoe, cam means engageable with the brake shoe and adapted to move the brake shoe into set position, spring means bearing against the brake shoe and opposing the movement of the cam, and a stop bar mounted on the yoke and extending under the bent portion of the brake shoe to limit vertical movement of said shoe.

2. A caster comprising a base plate, a yoke, a caster wheel rotatably mounted within said yoke, a ring within said yoke, a bearing disposed between the plate and the ring and engaged by said yoke, means securing said ring, bearing and plate together, said yoke being rotatable about the bearing and the ring and the plate, the ring and the bearing being fixedly secured together, a spring and a cam arranged in opposed relation on said yoke, and a member disposed vertically and movably mounted between said spring and said cam and adapted to be shifted by the cam into engagement with the said ring and said wheel to prevent both swivelling of the yoke and rotation of the wheel.

3. A caster comprising a base plate, a yoke under said plate, a caster wheel rotatably mounted in said yoke, a member within said yoke having teeth about its periphery, a bearing disposed between the plate and the toothed member and rotatably supporting the yoke, a bolt securing the toothed member, the bearing and the plate together, a spring and a cam mounted on said yoke in opposed relation to each other, a combined brake shoe and latch disposed vertically between the spring and the cam and having its upper portion in position for latching engagement with the toothed member to prevent swivelling of the yoke, and its lower portion in position for braking engagement with the wheel to prevent rotation thereof when shifted toward the toothed member and the wheel by said cam, and means for limiting the vertical displacement of the combined latch and brake and thereby insuring engagement between its upper end and the toothed member when in an operative position.

WALTER A. WINTER.
CLARENCE G. RUSH.
WALTER H. THIESSEN.